INVENTORS
WILLIAM D. PILE &
DONALD R. SHUSTER
BY
*JB Holden*
ATTORNEY

Oct. 3, 1967   W. D. PILE ETAL   3,344,833
TIRE BEAD LOOSENING TOOL

Filed Oct. 21, 1965   2 Sheets-Sheet 2

INVENTORS
WILLIAM D. PILE &
DONALD R. SHUSTER
BY J B Holden
ATTORNEY

United States Patent Office

3,344,833
Patented Oct. 3, 1967

3,344,833
TIRE BEAD LOOSENING TOOL
William D. Pile, Stow, Ohio, and Donald R. Shuster, Lansing, Mich., assignors to The Goodyear Tire & Rubber Company, Akron, Ohio, a corporation of Ohio
Filed Oct. 21, 1965, Ser. No. 499,158
4 Claims. (Cl. 157—1.17)

ABSTRACT OF THE DISCLOSURE

A tire bead loosening tool for use in changing tires on large wheels of the type used on earthmovers and other off-the-road vehicles. The tool has a hook-type fastening device which connects to special adaptors permanently attached at spaced locations around the side flange and which holds the tool in spaced relationship to the side flange while a plunger on the tool forces the tire bead axially inwardly to break the seal.

---

The prior art patents reveal many devices for removing pneumatic tires from rims. Most of these devices have been designed to aid in the removal of a tire from the rim after the rim has been taken off the wheel. When changing very large tires such as those used on earth movers or other large off-the-road vehicles, it is not practical to remove the rim from the wheel, particularly when it is necessary to change the tire at the location where the equipment is being used. Tires of this type are relatively difficult to mount and dismount due to their size and weight and the difficulty of manipulating the bead portion of the tire with respect to the side flanges of the rim, and because the bead portion becomes so firmly wedged on the bead seat.

In order to facilitate removal of such large tires from the rim, rims are multi-part, with one part contemplated by the inventor, being a removable bead seat ring with an integral side flange which telescopes over the rim base. When the bead seat ring with its integral side flange is slid off the rim base the tire may be pulled off the rim without having to pass over a side flange. In order to disassemble the rim it is first necessary to break the seal between the tire bead and the bead seat portion so as to release the pressure of the tire against the side flange. Most of the prior art devices for breaking bead seats are made to extend through the center opening of the rim and clamp against one side of the rim while pushing against the tire bead from the opposite side. This method is only practical after the rim is removed from the wheel. To remove tires from rims which are mounted on the wheel, the bead breaking tool must be attached to the rim on the same side that pressure is being applied to the bead. An example of such a tool may be seen in Patent No. 2,900,016 in which the bead breaking tool has opposed jaws which clamp onto the rim flange and hold the tool in position to drive a spade between the rim flange and the tire bead. This means of holding the tool in an operative position with respect to the tire and rim flange are satisfactory in some instances, however, when changing very large tires, a more positive means of attaching the tool to the rim is required to prevent the tool from slipping off the rim when the tool exerts high pressure against the tire.

When tubeless tires are used it is necessary that an airtight seal be created between the bead and the bead seat. In order to accomplish this the tire bead and the bead seat are designed at such an angle that the tire is wedged tightly on the bead seat and strong pressure is required to loosen it. The tight fit of the tire bead on the bead seat is also necessary to prevent the tire from slipping circumferentially around the rim when torque is applied to the wheel to drive the vehicle on which it is mounted. In the case of tube type tires the problem loosening the bead still exists even though a seal is not necessarily created between the bead and bead seat. To prevent slipping of the tire, the bead is wedged tightly on the bead seat portion of the rim and is difficult to dislodge.

A primary object of this invention is to provide a portable light weight hand tool for breaking the bead seal on large pneumatic tires without removing the rim from the wheel.

Another object of this invention is to provide a bead seal breaking tool which may be attached to a wheel rim on the same side that pressure is applied to the bead.

A further object of this invention is the provision of a tire loosening tool for use with a wheel rim having a specially adapted side flange which provides a more positive means of attaching the tool to the rim.

Still another object of the invention is to provide a tool which will perform the bead seal breaking operation where either an integral type bead seat ring and side flange or an integral type base and side flange are used, which will not accept more common tools.

These and other objects and advantages of this invention will appear more fully in the following specification and the accompanying drawings wherein.

Figure 1:
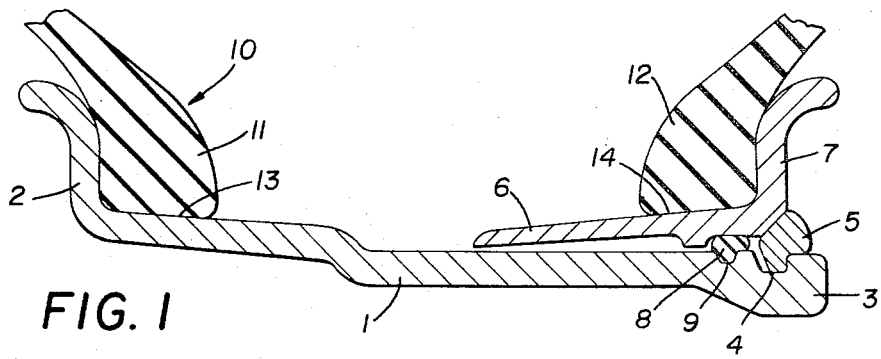
FIG. 1 is a cross sectional view of a typical tire rim on which the apparatus of the invention may be used.

In FIG. 1 a typical multiple-piece rim assembly for large off-the-road or earth mover tubeless or tube type tires is shown in which the numeral 1 represents an endless rim base having an inner integral side flange 2 along one edge and an integral gutter edge portion 3 along the opposite edge. The gutter edge portion 3 has an endless radially outwardly facing gutter 4 into which a split locking ring 5 is mounted to engage an endless bead seat ring 6 which telescopes over the rim base 1. The bead seat ring 6 has an outer integral side flange 7 extending radially outwardly from its laterally outward edge. Between the bead seat ring 6 and the base 1, an O-ring 8 is located in an endless channel 9 so that when the bead seat ring 6 is in the assembled position on the base 1, the O-ring 8 is distorted under axial and radial stresses to seal the passageways between the rim parts through which the air would escape.

A tire 10 having beads 11 and 12 is mounted on the rim assembly with the bead 11 sealing against a bead seat portion 13 which is laterally inwardly from the side flange 2 and with the bead 12 sealing against a bead seat portion 14 which is laterally inwardly of the integral flange 7 on the endless bead seat ring 6 when it is mounted on the rim base.

When a tire has been mounted on the rim as shown in FIG. 1, and inflated, the tire beads 11 and 12 are forced laterally outwardly by internal pressure against the side flanges 2 and 7 respectively and are wedged onto their respective bead seats 13 and 14. When tubeless tires are used, a seal is created between the beads and the bead seats due to the manner in which the beads are wedged onto the bead seats by the internal pressure of the tire.

Once this seal has been created and the beads have assumed this position on the rim, the bead seat ring 6 is held tightly against the split locking ring 5 and even after the internal pressure is at least partially removed from the tire 10, the bead seats tend to remain in the sealed position and continue to hold the bead seat ring 6 against the locking ring 5 causing great difficulty in removing the locking ring 5 to release the bead seat ring 6 and remove the tire. This problem also exists with tube type tires which become wedged onto the bead seats.

Figure 2:
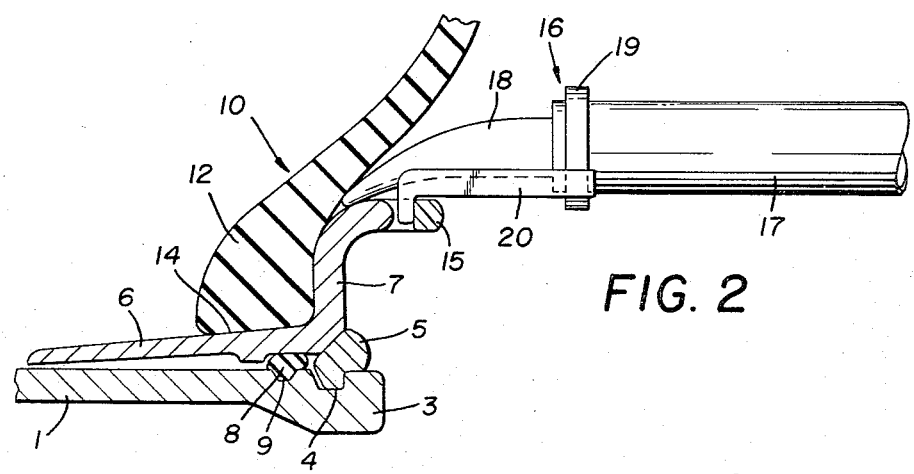
FIG. 2 is a cross sectional view of a portion of a tire and rim with one embodiment of the invention used therewith.
Figure 3:
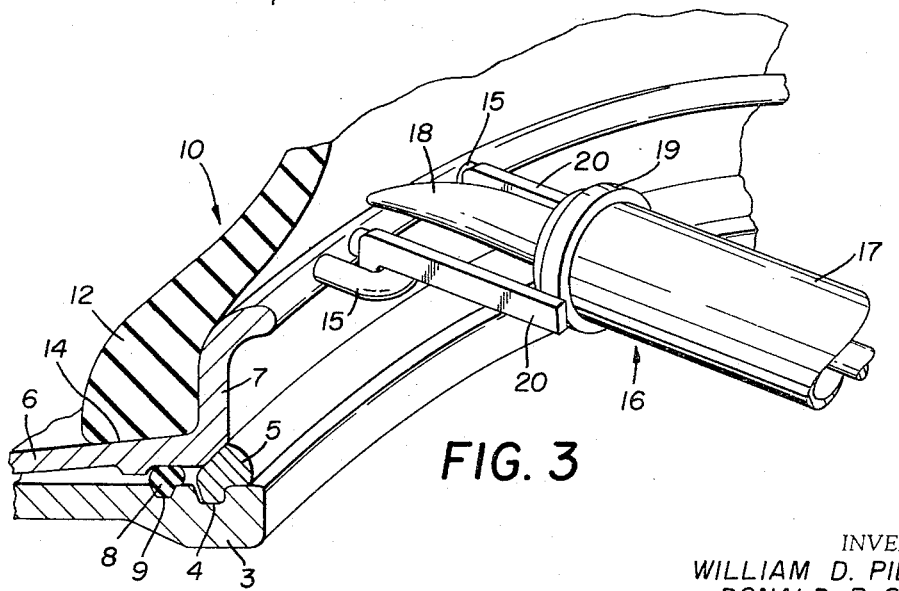
FIG. 3 is a perspective of the embodiment of the invention shown in FIG. 2.

One device for breaking the seal of the bead 12 on the bead seat 14 is shown in FIGS. 2 and 3 wherein for clarity the numbering of the parts is the same as FIG. 1.

A plurality of U-shaped brackets 15 are welded in pairs in spaced relationship on the side flange 7 around its laterally outward edge to provide a connection for attaching a bead seal breaking tool 16. The bead breaking tool 16 has a hydraulic actuator cylinder 17 which drives a spade tipped plunger 18 protruding from one end of the cylinder 17. The cylinder 17 is supplied with fluid from a pressure source not shown. A yoke 19 circumferentially connected to the cylinder 17 supports a pair of connecting hooks 20 on opposite sides of the cylinder. The hooks 20 extend outwardly from the cylinder 17 in the same direction as the spade 18. To connect the bead breaking tool 16 to the wheel flange 7 for use, the pair of hooks 20 are placed into a pair of the adjacent brackets 15. With the hooks 20 in the brackets 15 the bead breaking tool is manually held in a position whereby the longitudinal axis of the cylinder 17 is substantially perpendicular to a plane through the peripheral centerline of the tire 10.

The cylinder 17 is then actuated to drive the spade 18 between the side flange 7 and the tire 10 to force the tire inwardly from the flange 7 and thereby break the seal of the bead 12 on the bead seat 14. This action is repeated at several spaced locations around the side flange 7. Once the bead seal has been broken by forcing the bead 12 inwardly at several locations around the flange 7 and the pressure of the tire against the side flange 7 has been relieved, the split locking ring 5 may be easily removed and the bead seat ring 6 off the rim base 1. This same operation is subsequently performed on the fixed flange side of the rim to dislodge in similar fashion the so-called rear tire bead 11 from the bead seat 13. The tire 10 is then free for easy removal from the rim base 1.

Figure 4:
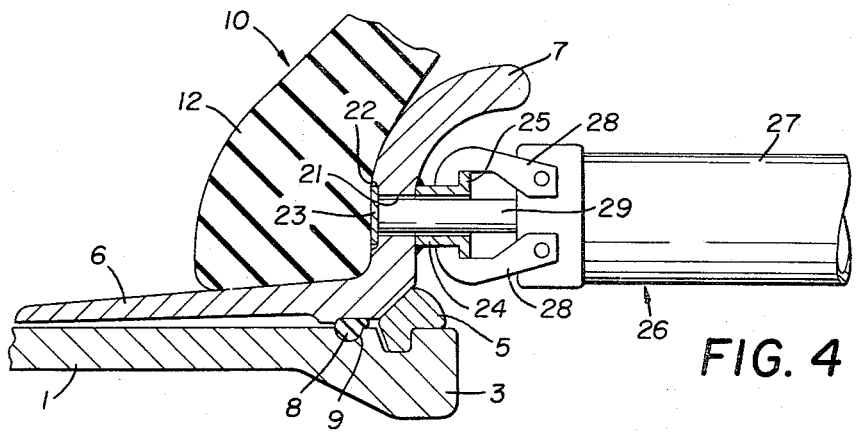
FIG. 4 is a cross sectional view of a tire and rim showing another embodiment of the invention.
Figure 5:
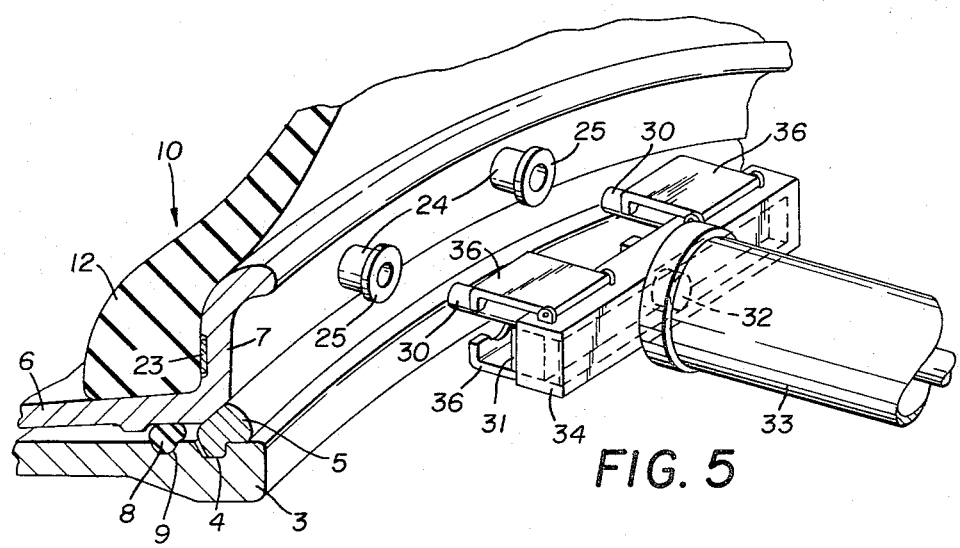
FIG. 5 is a perspective view of a slight variation of the embodiment of the invention shown in FIG. 4.

Another way of connecting the bead breaking tool to the side flange 7 is shown in FIG. 4. The side flange 7 has a plurality of circumferentially arranged ports 21 through its vertical portion. The laterally inward end of each of the ports 21 terminates in a recess 22 which retains therein a bead pusher plate 23 which may be held in by spring clips (not shown) or any conventional fastening means. The bead pusher plate 23 may be a continuous ring lying in a continuous annular recess 22 in the inner face of the flange 7 as shown in FIG. 5 or it may be a plurality of individual disc-shaped plates 23 lying in individual circular recesses 22 in the inner face of the flange 7, each of the recesses being coaxial with a corresponding port 21. A hollow cylindrical adaptor collar 24 is welded to the side flange 7 at the laterally outward end of each port with each collar coaxial with its corresponding port. Each collar 24 has a radially outwardly extending flange 25 at its laterally outward end. A bead breaking tool 26 may be attached to any of the collars 24 by a pair of clamping dogs 28 attached to one end of a hydraulic cylinder 27 which forms a part of the bead breaking tool 26. The clamping ends of dogs 28 are curved to fit the collar 24.

A push rod 29 extends from the same end of the cylinder 27 as the clamping dogs 28 and when actuated by the cylinder 27 it moves outwardly therefrom along its longitudinal axis. To use the bead breaking tool 26 the dogs 28 are clamped onto the collar 24 with the clamping ends of the dogs gripping the collar 24 laterally inwardly of the flange 25. Upon actuation of the cylinder the push rod 29 passes through the collar 24 and the port 21 to press against the bead pusher plate 23 and force the tire bead 12 inwardly off the bead seat 14 thereby breaking the bead seal. This action is repeated at various spaced locations around the flange 25. The flange 25 prevents the dogs 28 from slipping off the collar 24 due to the force of the push rod 29 when it is actuated by the cylinder 27. The flange 25 provides a reacting shoulder to restrain the hydraulic cylinder 27 from lateral outward movement when it is actuated to drive the push rod 29 against the bead pusher plate 23 to loosen the bead 12.

Figure 6:
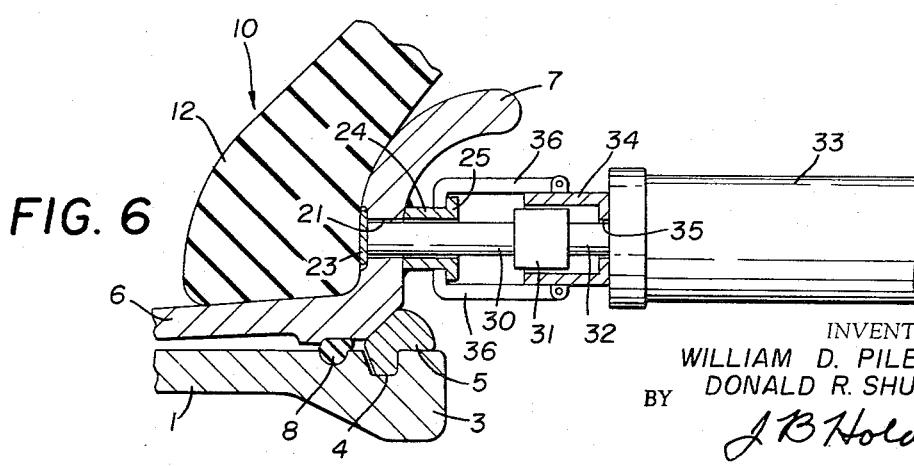
FIG. 6 is a cross sectional view of the embodiment shown in FIG. 5.

To reduce the time required to loosen a bead, the bead breaking tool may be easily adapted to operate two push rods simultaneously by the apparatus shown in FIGS. 5 and 6 in which two parallel push rods 30 are perpendicularly attached at one end to one side of a rectangular cross bar 31. A single push rod 32 driven by a hydraulic cylinder 33 has its protruding end perpendicularly attached to the opposite side of the cross bar 31. A hollow rectangular housing 34 having one side open and a round hole 35 in the opposite side is laterally mounted on the end of the hydraulic cylinder 33 with the push rod 32 passing through the hole 35 and the cross bar 31 slideably received inside the housing. A pair of clamping dogs 36 are hinged to the top of the housing 34 and an identical pair of dogs 36 are hinged to the bottom of the housing 34. Both pairs of dogs 36 extend outwardly away from the cylinder 33 and have inwardly turned ends curved to simultaneously grip two adjacent collars 24 on the side flange 7. The dogs 36 engage the collars 24 to prevent lateral movement of the housing 34 and the cylinder 33 away from the side flange 7 when the cylinder actuates the push rod 32 and the cross bar 31 to drive the push rods 30 through the collars 24 and the ports 21 in the side flange and push the tire 10 inwardly to break the bead seal.

It will be seen that all the embodiments of this invention accomplish the same result and differ only in the manner of securing the bead breaking tool to the side flange and in whether the pressure is applied against the tire bead by driving a spade between the flange and the tire or by driving a push rod through a port in the flange to press against the tire.

Although both embodiments of the invention shown in FIGS. 2 through 6 show the bead breaking tools 16 and 26 used on the outer integral flange 7 and the bead seat ring 6 for the purpose of illustrating the invention, either tool 16 or 26 may also be used on the inner integral side flange 2 on the rim base 1. If the tool 16 is used, then the U-shaped brackets 15 are mounted on the flange 2 in the same manner as on the flange 7. If the tool 26 is used, then ports similar to the ports 21 and the flanged collar 24 are provided in the inner integral side flange 2 in the same manner as on the flange 7.

While certain representative embodiments have been shown for the purpose of illustrating the invention, it will be apparent to those skilled in this art that various changes and modifications may be made therein without departing from the spirit or scope of the invention.

What is claimed is:

1. The combination of a tire bead loosening tool and a special adaptor means for attaching the tool to the side flange of a wheel rim during the loosening of a tire mounted thereon, comprising:

(a) an actuator;

(b) a plunger driven by the actuator for imparting inward movement to the tire bead away from the side flange to break the seal between the bead and the rim;

(c) a plurality of adaptors permanently attached at spaced locations around the circumference of the side flange; and (d) hook means mounted on the actuator for removably attaching said actuator to at least one of the adaptors to hold the actuator in spaced relationship to the side flange during the operation of the tool.

2. The combination according to claim 1 in which the side flange has a plurality of circumferentially arranged ports through which the plunger may exert pressure upon the tire to break the bead seal and in which each adaptor comprises a plurality of hollow cylindrical collars, each one having an outwardly turned flange at one end and having the other end attached to the outer face of the side flange coaxial with one of the circumferentially arranged ports so that the plunger is driven through at least one of the collars and the port which is coaxial therewith.

3. The combination according to claim 2 in which the hook means for attaching the actuator to one of the adaptors includes at least one pair of inwardly turned clamps hinged to the actuator so that they move toward each other and hook over the outwardly turned flange on at least one of the adaptors.

4. The combination according to claim 1 in which the adaptors are U-shaped brackets, the open ends of which are fastened to the side flange and the closed ends protrude to receive at least one hook-like member extending from the actuator.

References Cited

UNITED STATES PATENTS

| | | | |
|---|---|---|---|
| 2,753,923 | 7/1956 | Bower | 157—1.17 |
| 2,775,290 | 12/1956 | Mondaro | 157—1.17 |
| 2,901,029 | 8/1959 | Mraz | 157—1.17 |
| 2,956,620 | 10/1960 | Schwarz | 157—1.17 |
| 3,240,252 | 3/1966 | Ruhland et al. | 157—1.17 |

GRANVILLE Y. CUSTER, JR., *Primary Examiner.*